Dec. 1, 1931.   G. C. GUM   1,834,097
AUTOMATIC FRUIT JUICE, PULP, AND SEED EXTRACTOR
Filed June 26, 1929   14 Sheets-Sheet 2
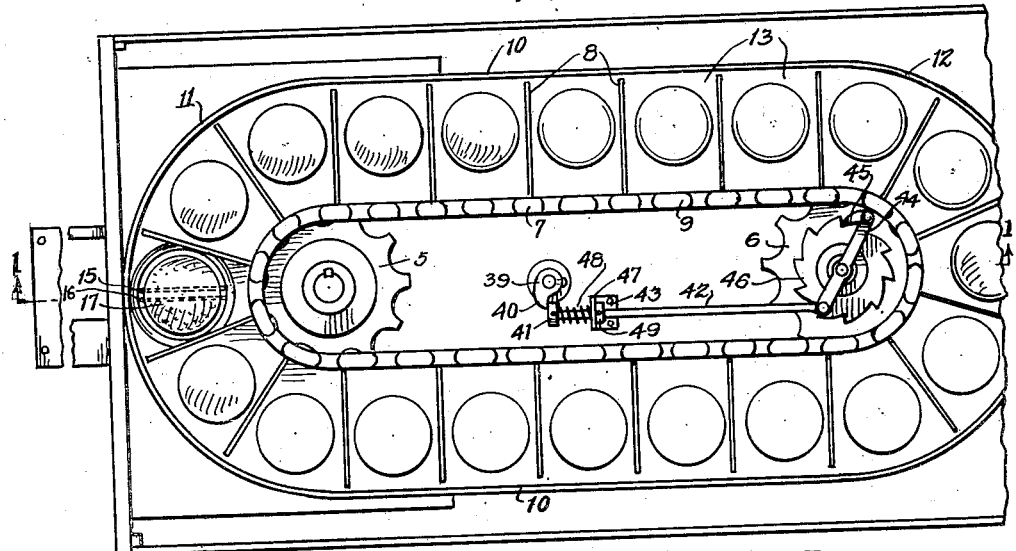
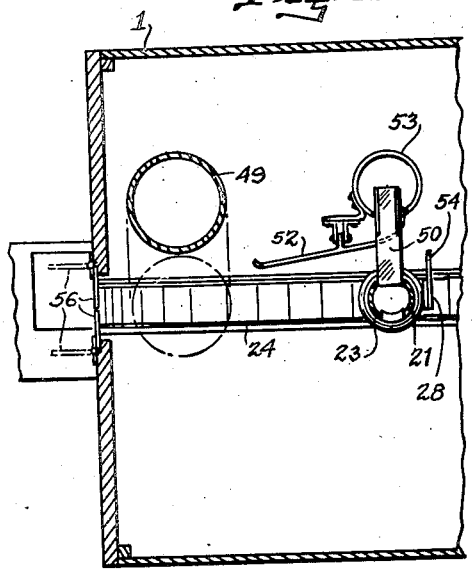
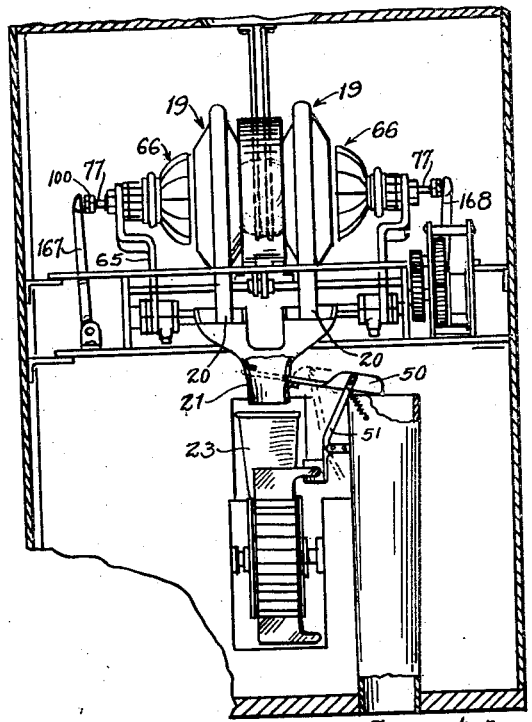
Inventor
Guy C. Gum
By Mason Fenwick Lawrence
Attorneys Dec. 1, 1931.  G. C. GUM  1,834,097
AUTOMATIC FRUIT JUICE, PULP, AND SEED EXTRACTOR
Filed June 26, 1929   14 Sheets-Sheet 3

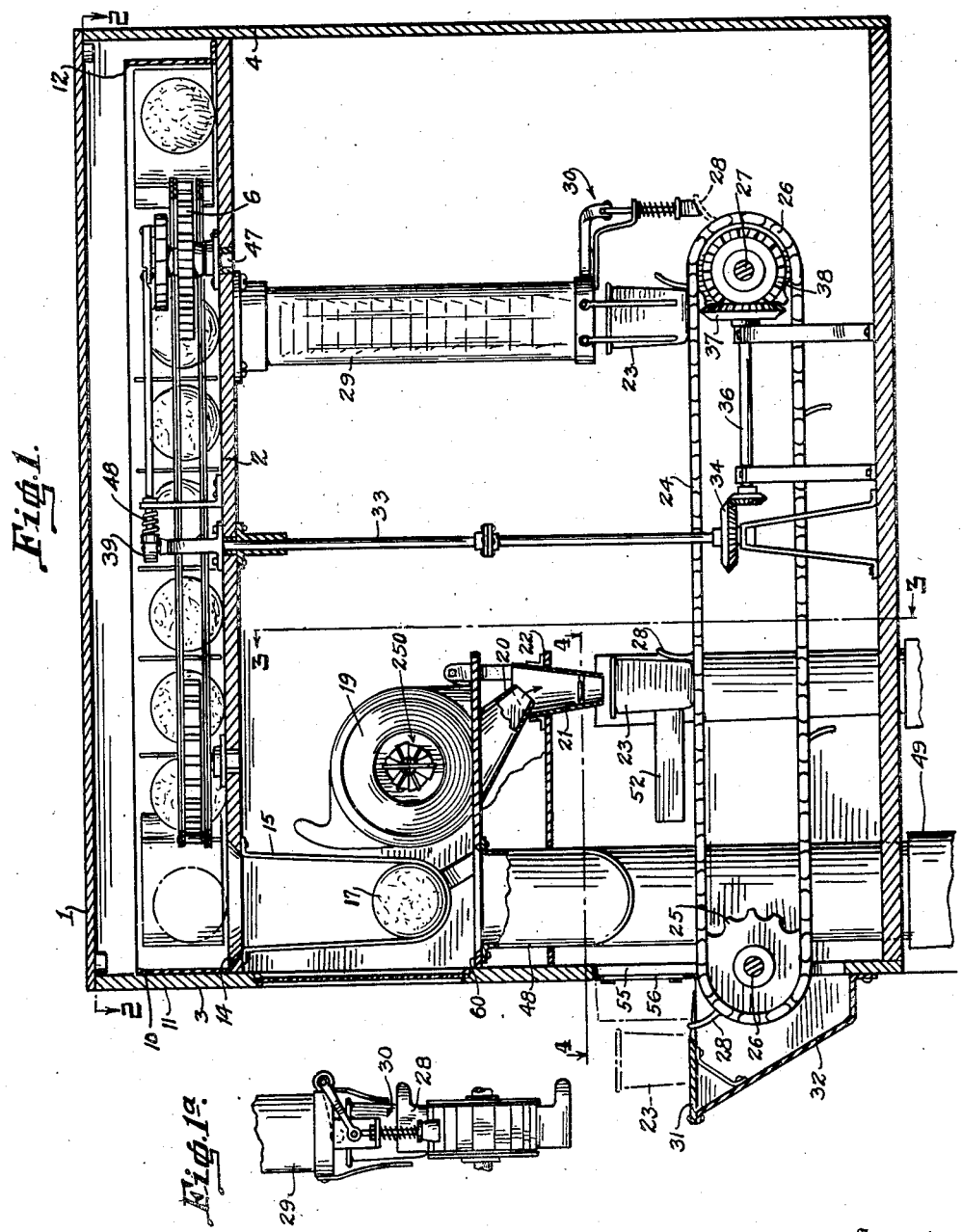

Inventor
Guy C. Gum
By Mason Fenwick & Lawrence
Attorneys

Dec. 1, 1931.      G. C. GUM.      1,834,097
AUTOMATIC FRUIT JUICE, PULP, AND SEED EXTRACTOR
Filed June 26, 1929      14 Sheets-Sheet 4

Inventor
Guy C. Gum
By Mason Fenwick Lawrence
Attorneys

Dec. 1, 1931. G. C. GUM 1,834,097
AUTOMATIC FRUIT JUICE, PULP, AND SEED EXTRACTOR
Filed June 26, 1929 14 Sheets-Sheet 5
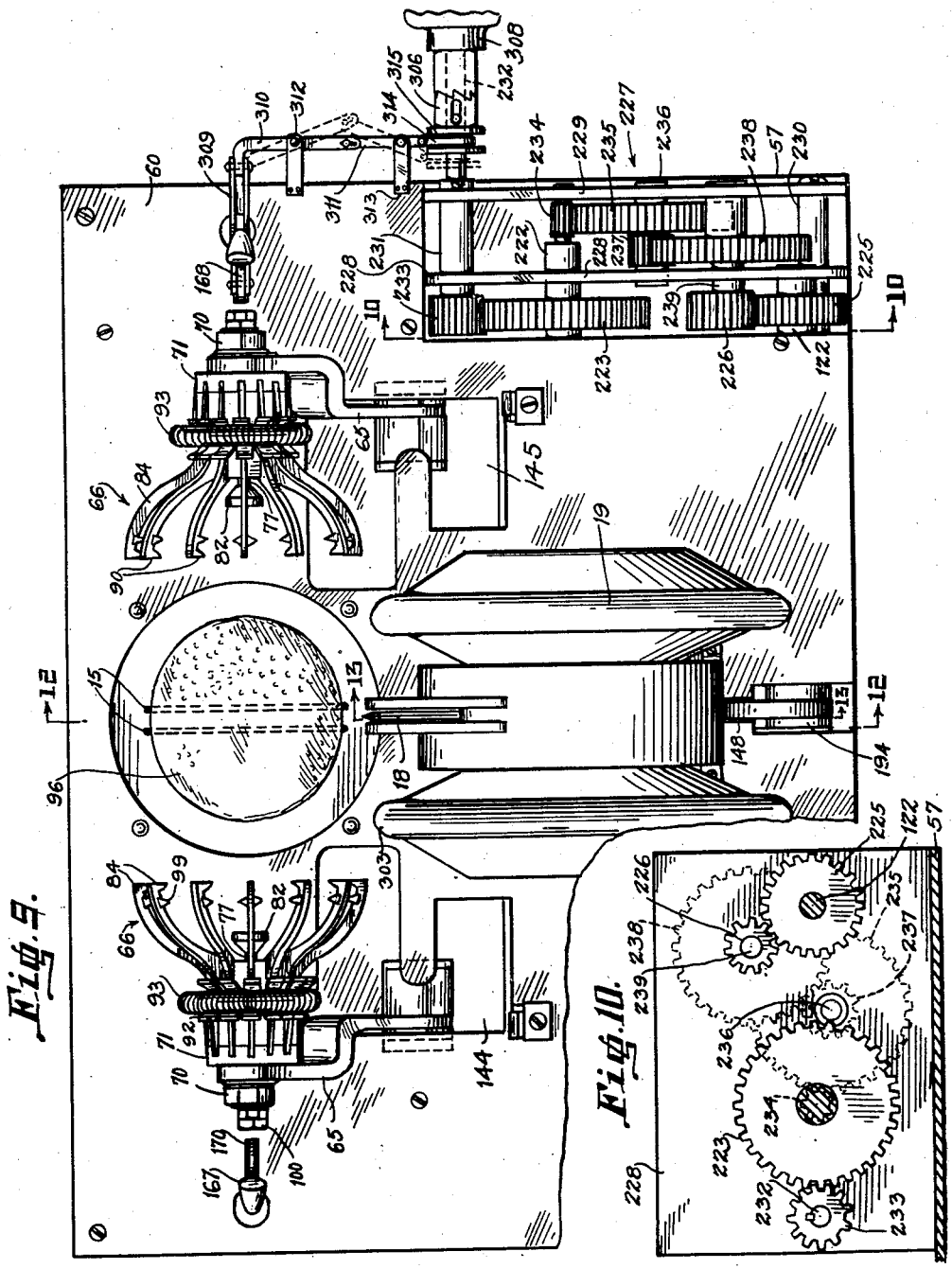
Inventor
Guy C. Gum
By Mason Fenwick & Lawrence Attorneys

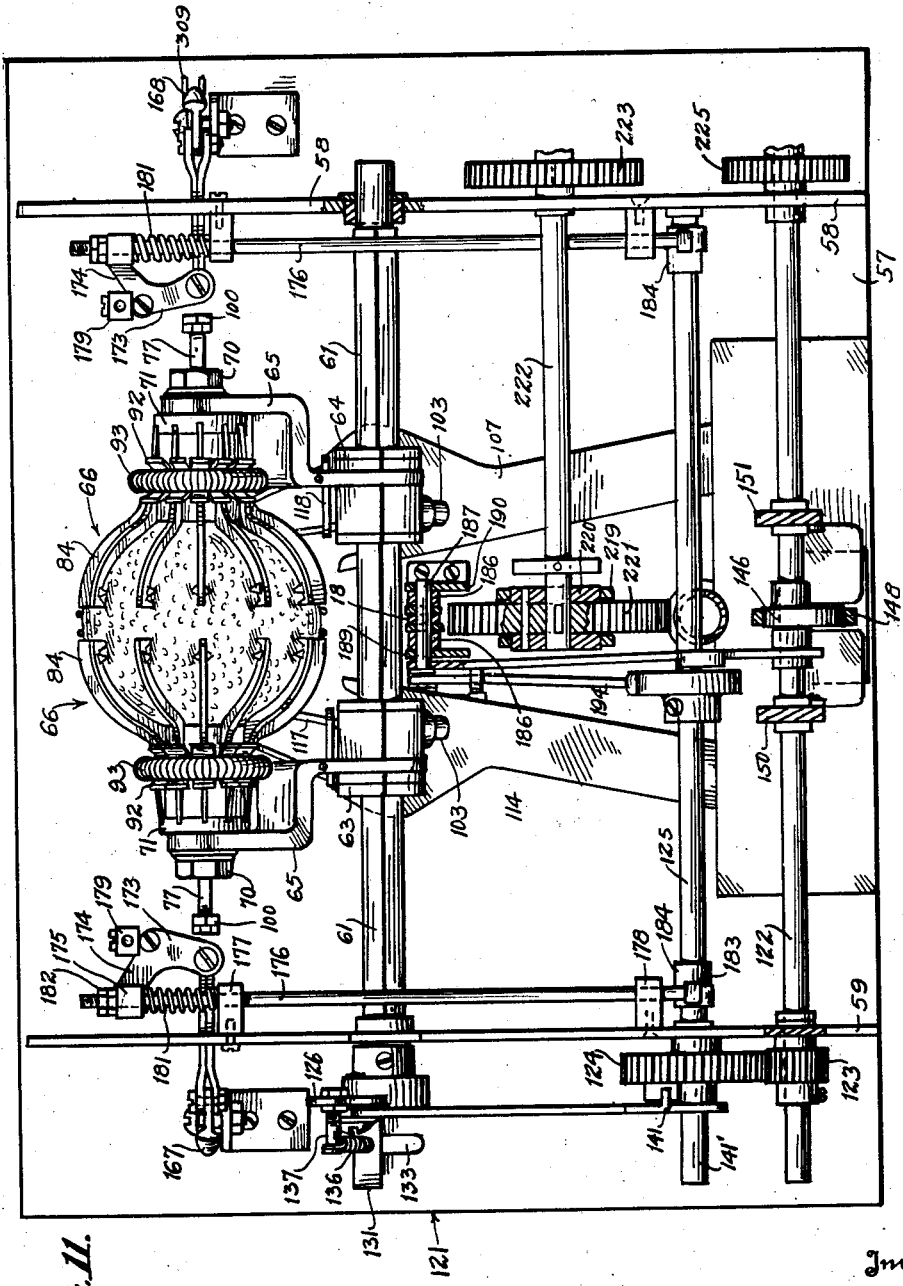

Dec. 1, 1931.                G. C. GUM                 1,834,097
            AUTOMATIC FRUIT JUICE, PULP, AND SEED EXTRACTOR
                Filed June 26, 1929      14 Sheets-Sheet 7
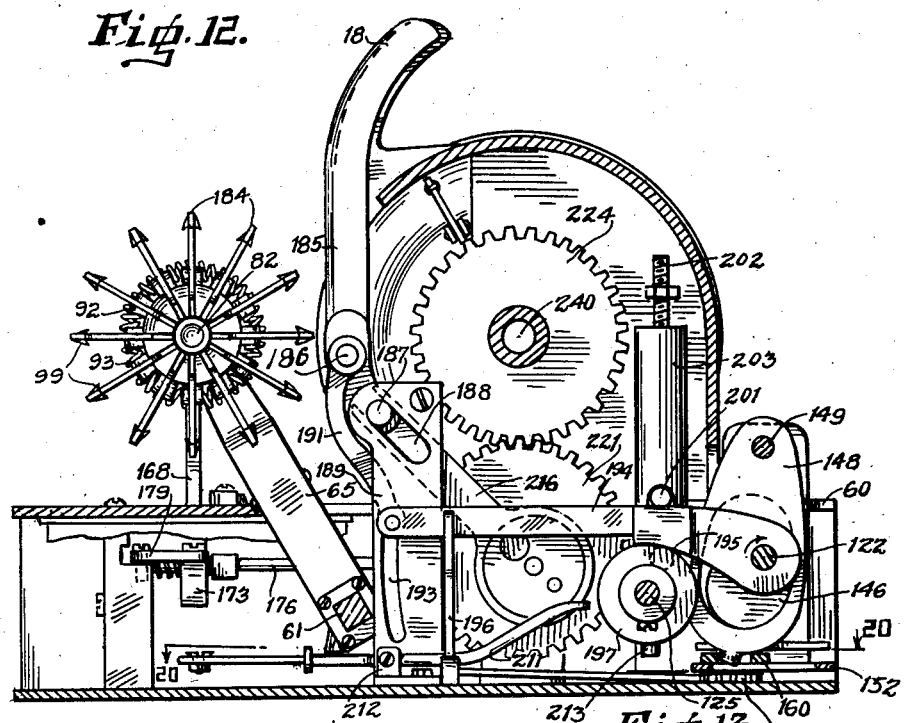
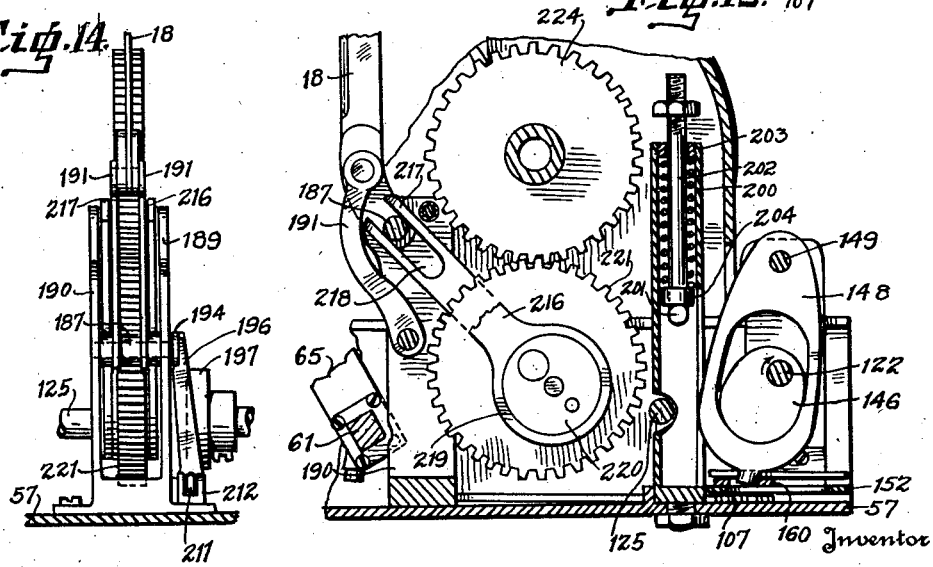
Inventor
Guy C. Gum
By Mason Fenwick Lawrence
                    Attorneys Dec. 1, 1931.     G. C. GUM     1,834,097
AUTOMATIC FRUIT JUICE, PULP, AND SEED EXTRACTOR
Filed June 26, 1929     14 Sheets-Sheet 8
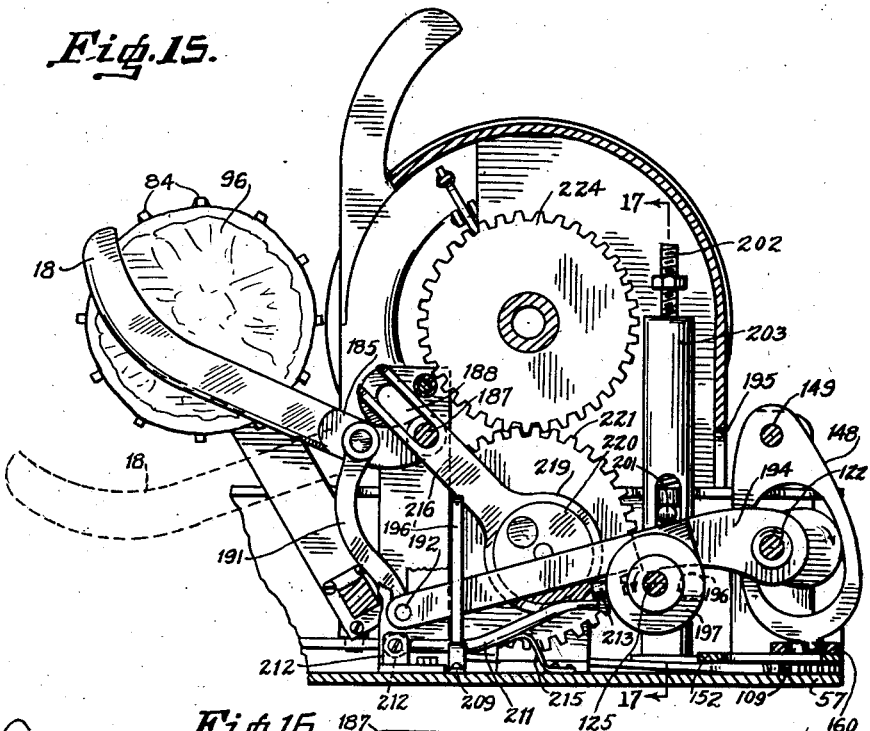
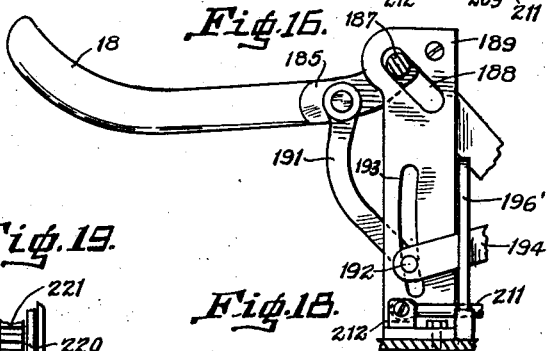
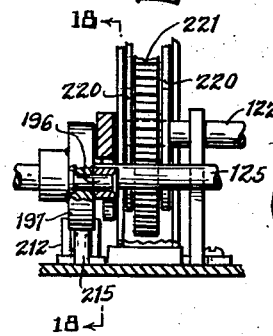
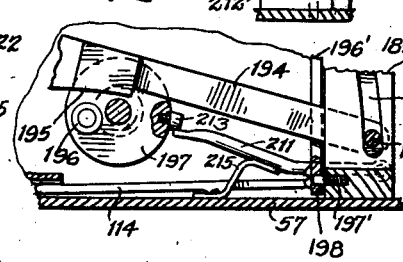
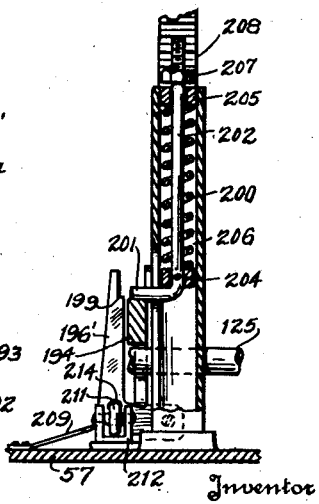
Inventor
Guy C. Gum
By Mason Fenwick Lawrence
Attorneys

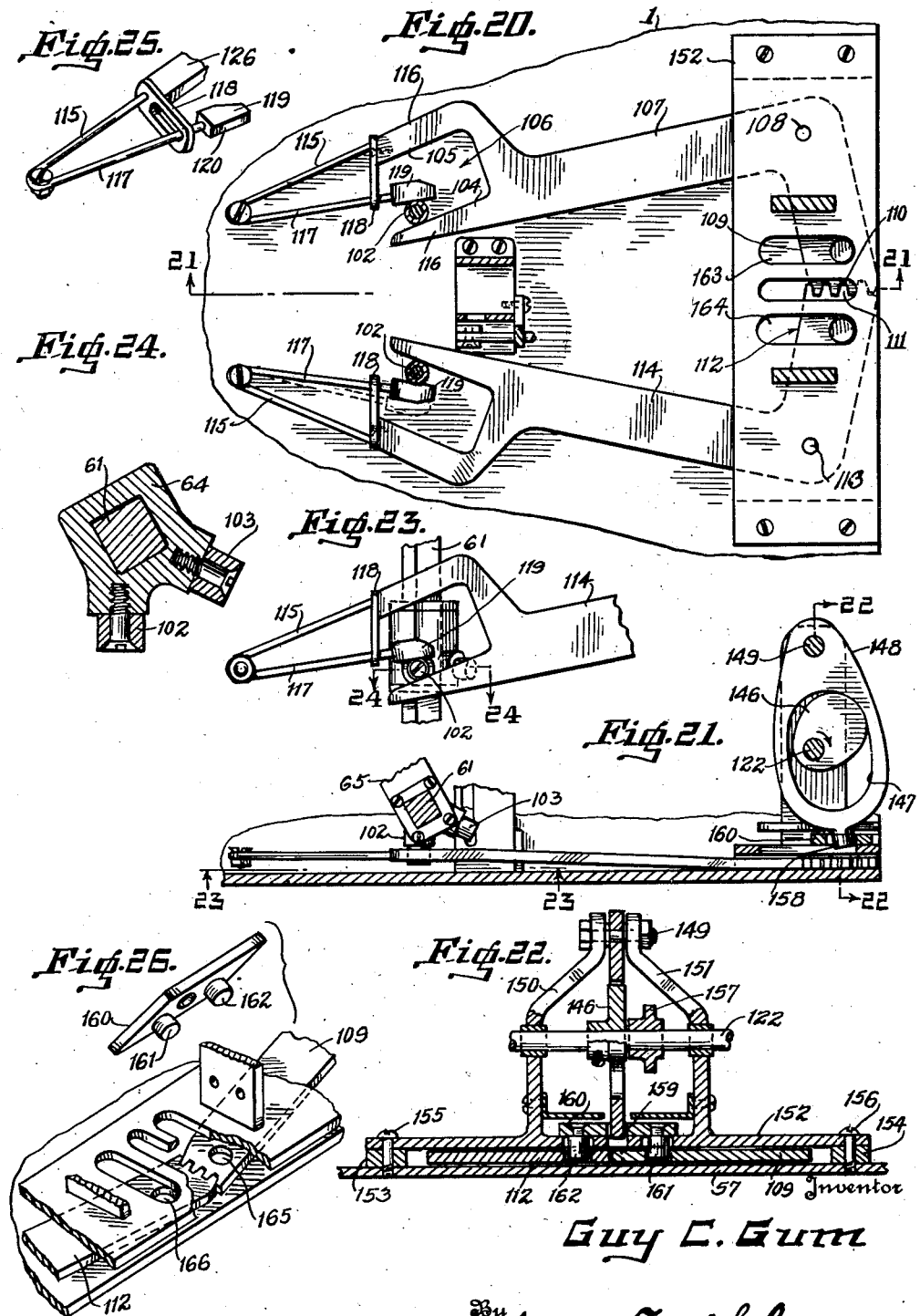

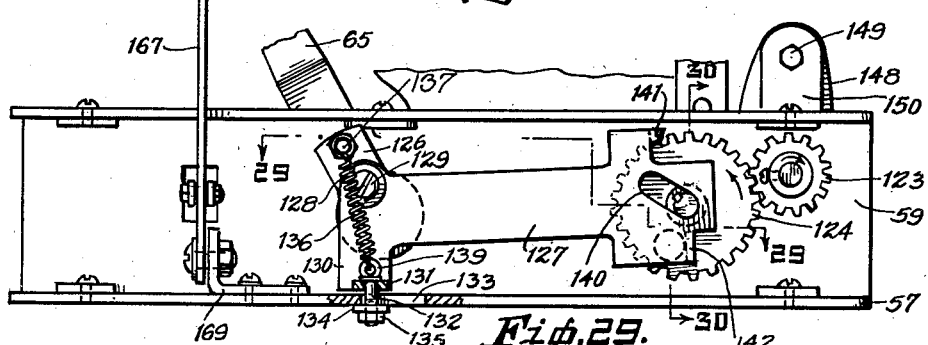
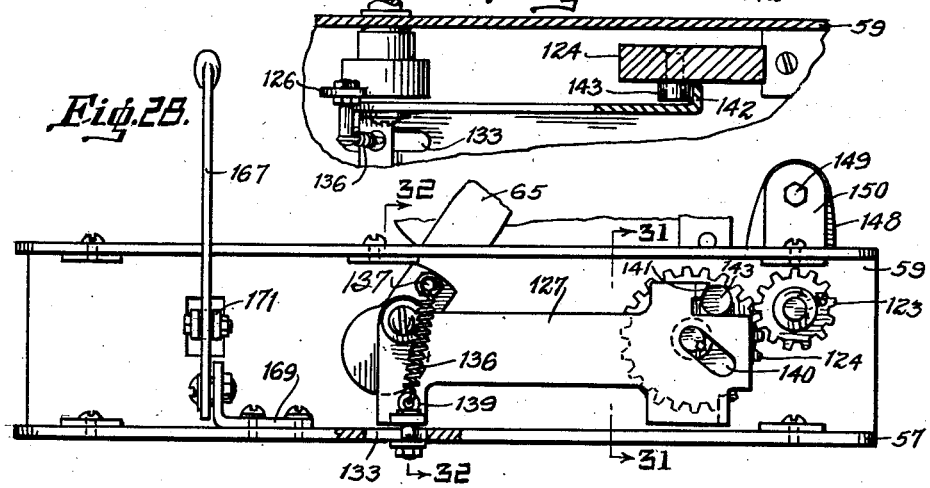
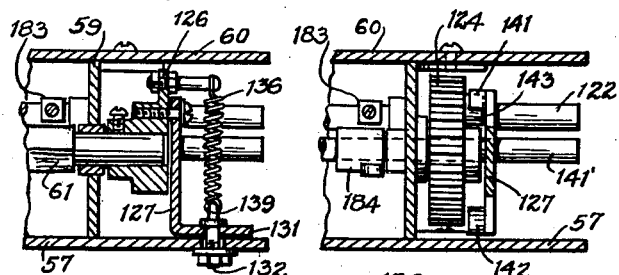
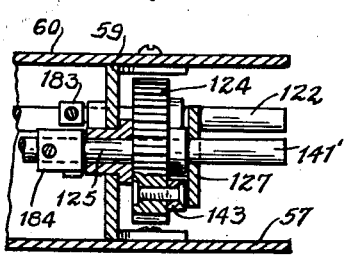
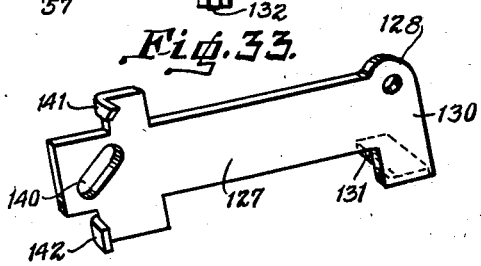

Dec. 1, 1931.  G. C. GUM  1,834,097
AUTOMATIC FRUIT JUICE, PULP, AND SEED EXTRACTOR
Filed June 26, 1929   14 Sheets-Sheet 11
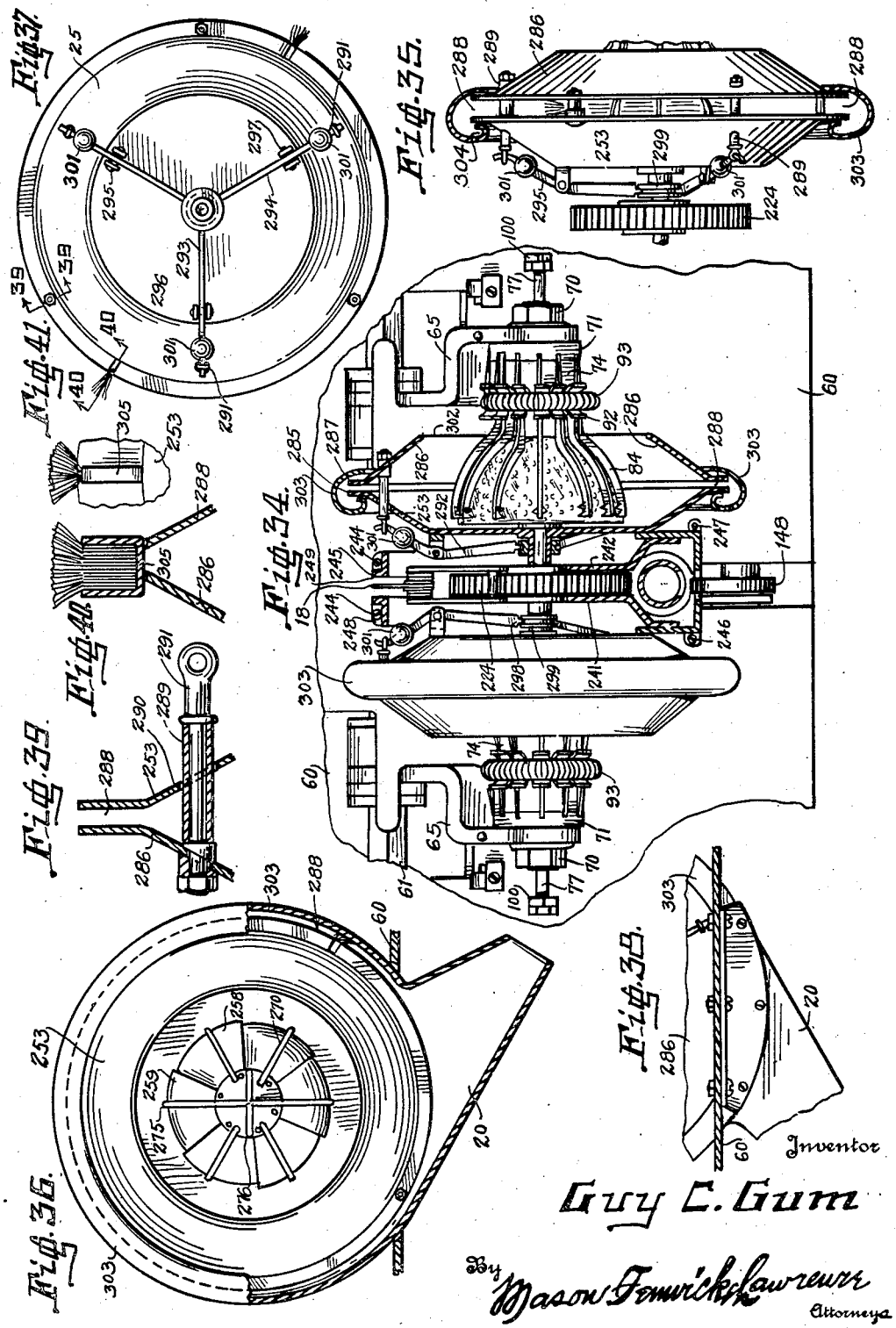
Inventor
Guy C. Gum
By Mason Fenwick Lawrence
Attorneys

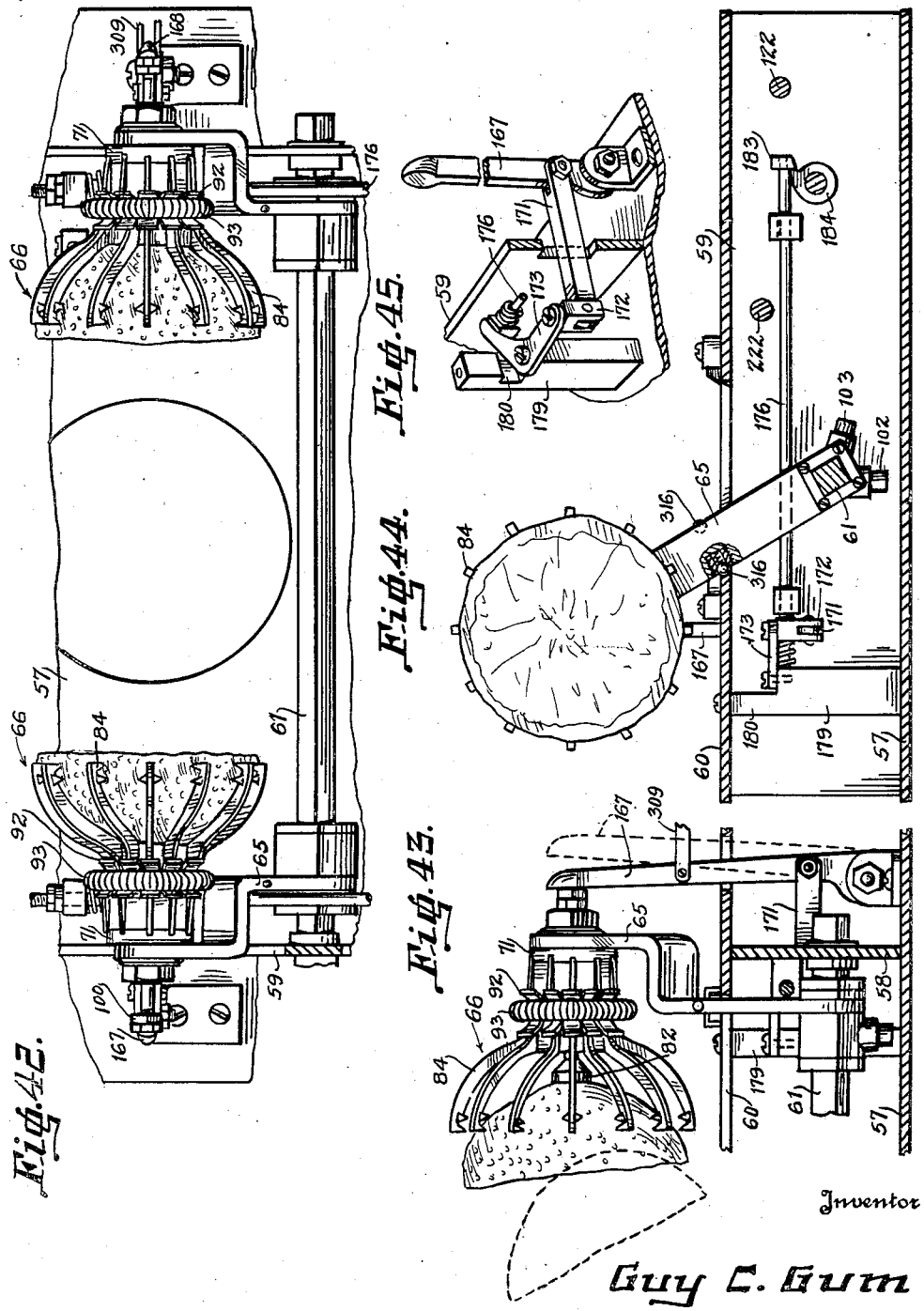

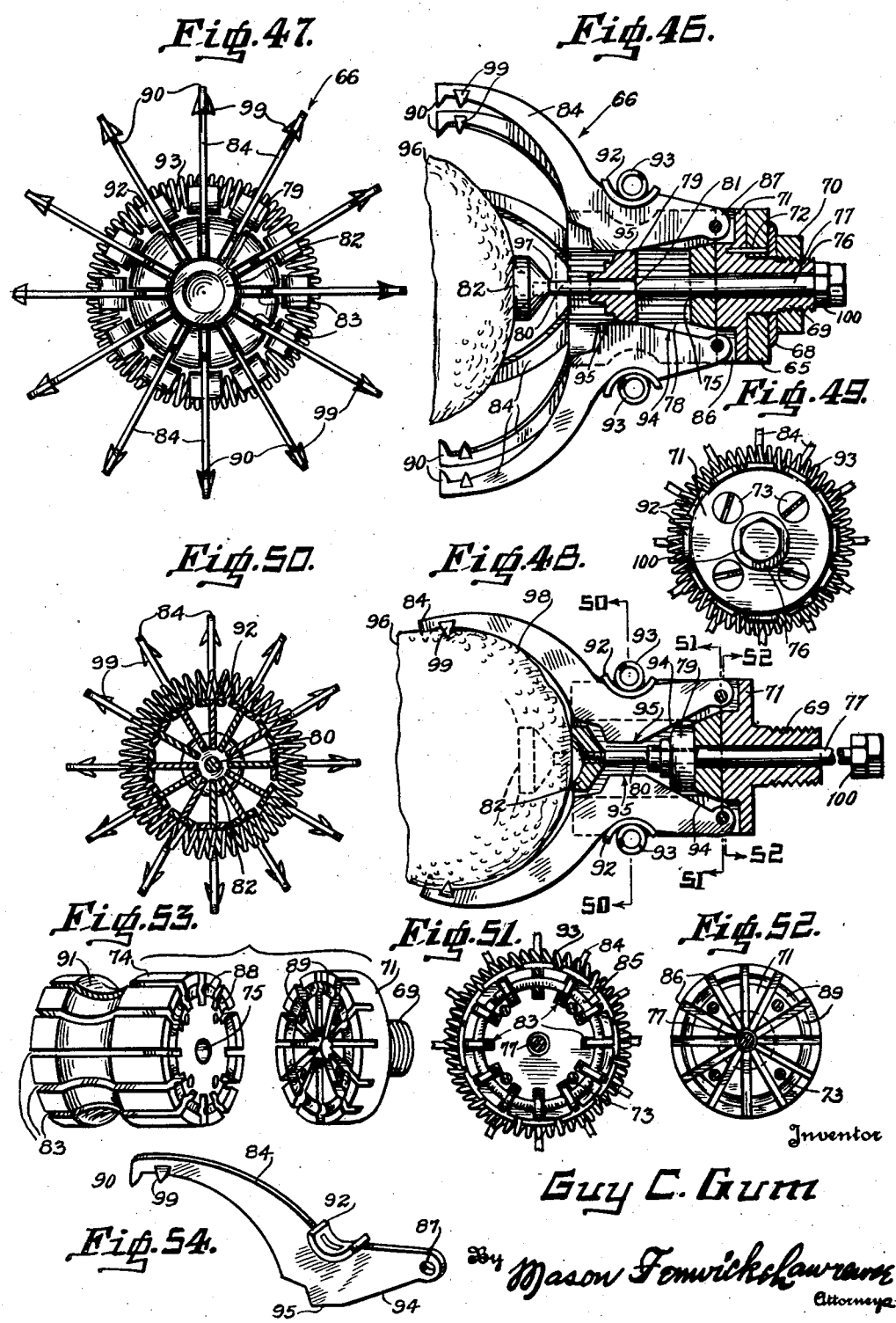

Dec. 1, 1931.  G. C. GUM  1,834,097
AUTOMATIC FRUIT JUICE, PULP, AND SEED EXTRACTOR
Filed June 26, 1929  14 Sheets-Sheet 14
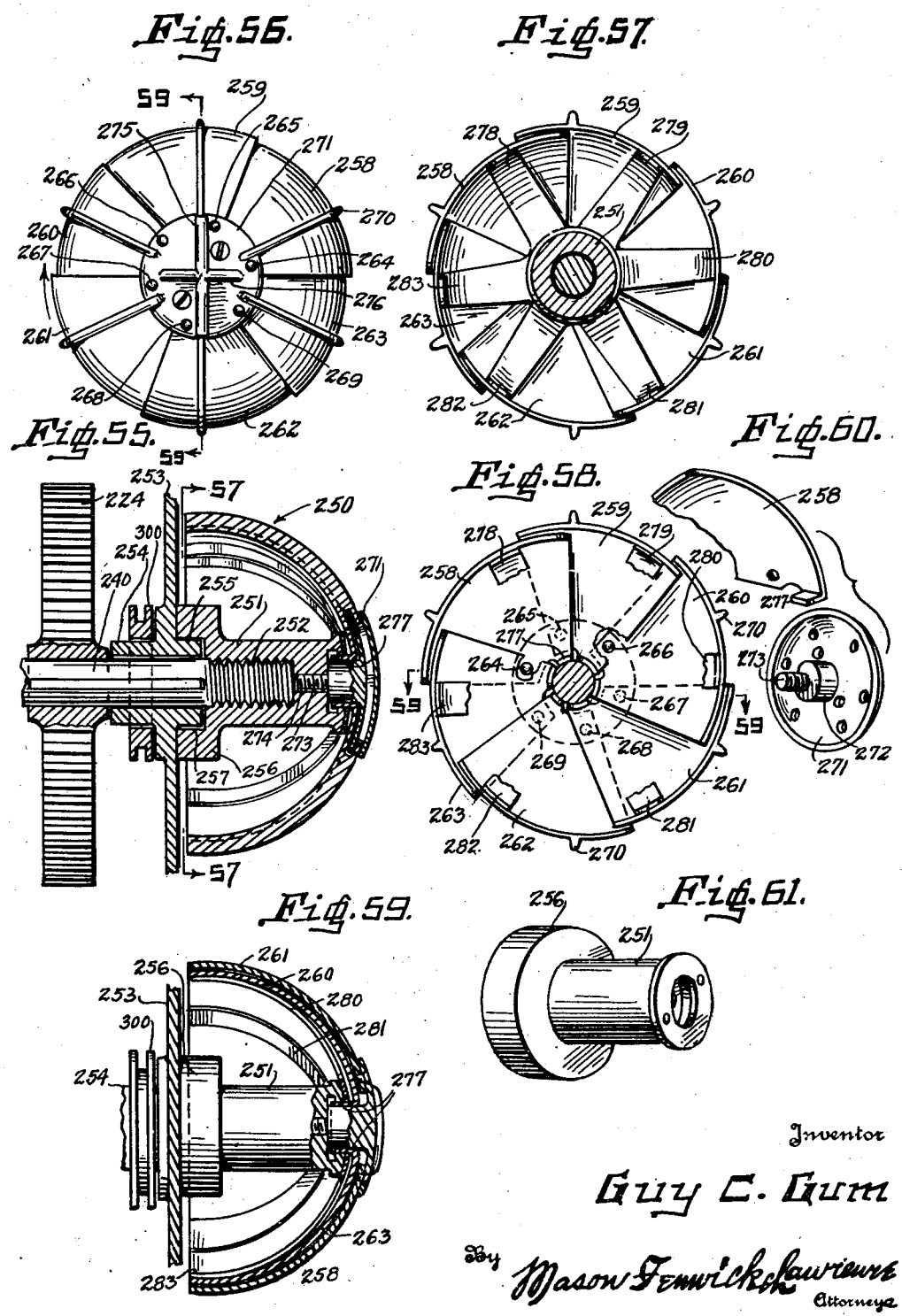
Inventor
Guy C. Gum
By Mason Fenwick & Lawrence
Attorneys Patented Dec. 1, 1931

1,834,097

UNITED STATES PATENT OFFICE

GUY C. GUM, OF JACKSONVILLE, FLORIDA, ASSIGNOR TO TRACY ACOSTA, OF JACKSONVILLE, FLORIDA

AUTOMATIC FRUIT JUICE, PULP, AND SEED EXTRACTOR

Application filed June 26, 1929. Serial No. 373,755.

The invention forming the subject matter of this application is an apparatus designed to be automatically operated, preferably by coin control, for the purpose of extracting the juice from oranges, grapefruit, lemons, and similar fruits which are provided with a rind, skin or covering capable of being firmly held by a chuck.

The main object of the invention is to provide a machine for automatically extracting juice, pulp and seed, either one or both or all, in one operation, from various fruits, vegetables or commodities; and particularly from citrus fruits.

Another object of the invention is to provide a machine to which whole fruits of the citrus variety may be fed to the machine automatically to be cut in two, and to have the juice extracted from the cut parts automatically.

A further object of the invention is to provide a machine of this type which will not only automatically extract the juice from whole fruit, but which will also dispose automatically of the pulp and seeds separated from the previously extracted juice.

Other objects of the invention will become apparent as the detailed description thereof proceeds.

In the drawings—

Fig. 1 is an assembly view, partly in elevation and partly in section, of the apparatus as a whole;

Fig. 1a is an end elevation of an automatically operated trip mechanism for feeding cups to an endless conveyor forming part of the apparatus;

Fig. 2 is a top plan of the apparatus shown in Fig. 1;

Fig. 3 is a section taken on the line 3—3 of Fig. 1;

Fig. 4 is a horizontal section taken on the line 4—4 of Fig. 1;

Fig. 9 is a plan of the fruit cutting and milling machine;

Fig. 10 is a vertical section taken on the line 10—10 of Fig. 9;

Fig. 11 is a plan of the cutting and milling machine with the top thereof removed and several of the parts shown in section for clearness of illustration;

Fig. 12 is a vertical section taken on the line 12—12 of Fig. 9;

Fig. 13 is a vertical section taken on the line 13—13 of Fig. 9;

Fig. 14 is an end elevation of the parts shown in Fig. 13;

Fig. 15 is a section similar to Fig. 12, but with the parts shown in different position;

Fig. 16 is a fragmentary elevation showing several of the parts illustrated in Fig. 15 in a different position;

Fig. 17 is a vertical section taken on the line 17—17 of Fig. 15;

Fig. 18 is a vertical section taken on the line 18—18 of Fig. 19;

Fig. 19 is a fragmentary detail illustrating several of the parts shown in Fig. 18;

Fig. 20 is a horizontal section taken on the line 20—20 of Figure 12;

Fig. 21 is a vertical section taken on the line 21—21 of Figure 20;

Fig. 22 is a vertical section taken on the line 22—22 of Figure 21;

Fig. 23 is a bottom plan of one end of one of the bellcrank levers illustrated in Fig. 20;

Fig. 24 is a vertical section taken on the line 24—24 of Fig. 23;

Fig. 25 is a perspective view of a guide spring secured to the bellcrank lever shown in Fig. 20;

Fig. 26 is an exploded perspective illustrating details of construction connected with the operation of the bellcrank shown in Fig. 20;

Fig. 27 is a side elevation of snap-over spring controlled mechanism for moving fruit supporting arms from front to rear of machine, and vice versa;

Fig. 28 is a side elevation of the mechanism shown in Fig. 27, but with the parts in a different operative position;

Fig. 29 is a horizontal section on the line 29—29 of Fig. 27;

Fig. 30 is a vertical section taken on the line 30—30 of Fig. 27;

Fig. 31 is a vertical section taken on the line 31—31 of Fig. 28;

Fig. 32 is a vertical section taken on the line 32—32 of Fig. 28;

Fig. 33 is a perspective of one of the elements shown in Fig. 27;

Fig. 34 is a fragmentary plan, with parts shown in section, of milling mechanism forming part of this invention;

Fig. 35 is an end elevation of one of the parts shown in Fig. 34;

Fig. 36 is a side elevation of part of the milling device shown in Fig. 34;

Fig. 37 is a side elevation of the parts shown in Fig. 35;

Fig. 38 is a fragmentary detail of several of the elements shown in Fig. 36;

Fig. 39 is a transverse section taken on the line 39—39 of Fig. 37;

Fig. 40 is a transverse section taken on the line 40—40 of Fig. 37;

Fig. 41 is a fragmentary side elevation of the mechanism shown in Fig. 40;

Fig. 42 is a fragmentary elevation of parts of the fruit supporting mechanism forming part of this invention;

Fig. 43 is an end elevation of a fruit holding chuck forming part of this invention and showing it in operative connection with an extractor bar;

Fig. 44 is an end elevation of the parts shown in Fig. 43, but with several elements broken away and shown in section to illustrate details of construction;

Fig. 45 is a perspective view of an extractor bar;

Fig. 46 is a central vertical section through one of the chuck members for holding fruit properly positioned during the processing thereof by this machine;

Fig. 47 is an end elevation of the parts shown in Fig. 46;

Fig. 48 is a view similar to Fig. 46 but showing the several parts of the chuck contracted to hold a part of a fruit between the jaws thereof;

Fig. 49 is a rear end elevation of the parts shown in Fig. 48;

Fig. 50 is a vertical transverse section taken on the line 50—50 of Fig. 48;

Fig. 51 is a vertical section taken on the line 51—51 of Fig. 48;

Fig. 52 is a vertical section taken on the line 5ᶜ—52 of Fig. 48;

Fig. 53 is an exploded perspective of parts of the chuck mechanism shown in Fig. 46;

Fig. 54 is a perspective of one of the fruit gripping elements forming part of the said chuck mechanism;

Fig. 55 is a vertical central section through a self-cleaning milling element forming part of this machine;

Fig. 56 is an end elevation of the element shown in Fig. 55;

Fig. 57 is a vertical section taken on the line 57—57 of Fig. 55;

Fig. 58 is a section similar to that shown in Fig. 57, but with several parts thereof removed to show details of construction;

Fig. 59 is a vertical section taken on the line 59—59 of Fig. 56;

Fig. 60 is an exploded perspective of several of the elements shown in Fig. 57; and Fig. 61 is a perspective of one of the elements shown in Figs. 55 and 59.

Figure 5:
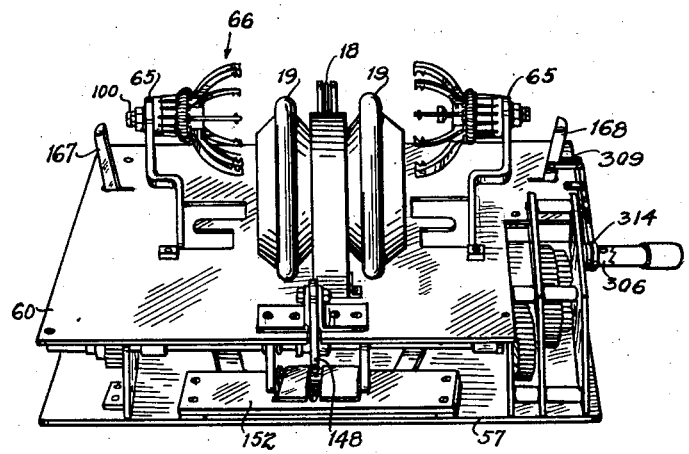
Fig. 5 is a perspective of the fruit cutting and milling machine forming part of the apparatus.
Figure 6:
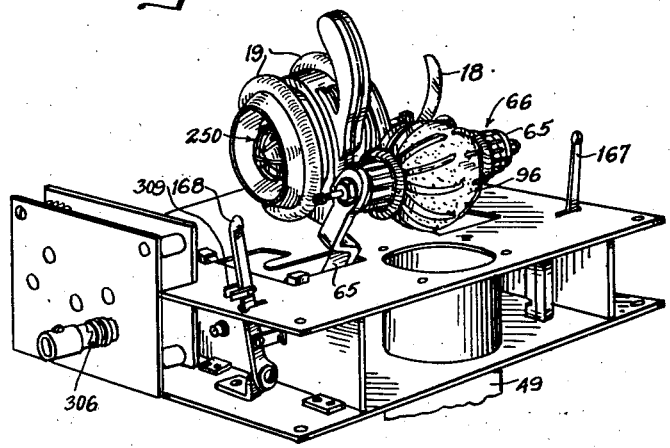
Fig. 6 is a perspective of the same machine taken from another point of view.
Figure 7:
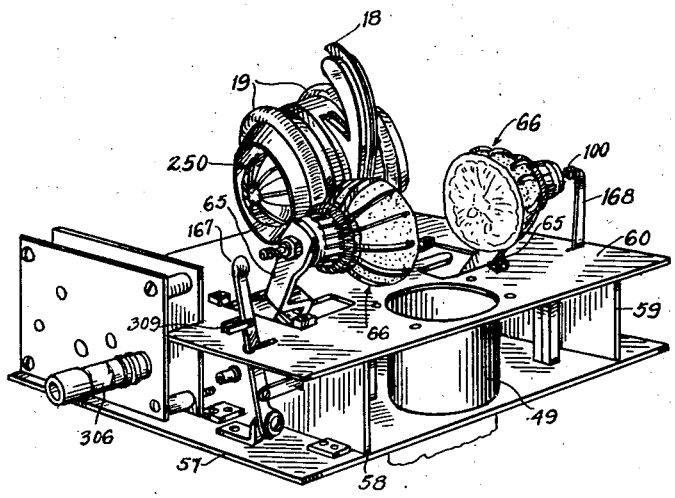
Fig. 7 is a perspective of the apparatus shown in Fig. 6, but the several parts thereof being shown in different positions.
Figure 8:
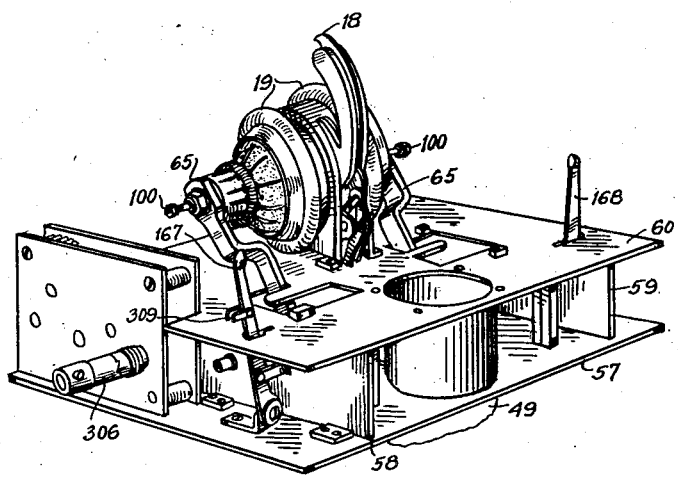
Fig. 8 is a perspective of the orange cutting machine with the parts arranged in position for milling the juice from the previously cut halves of an orange held between cooperating chucks forming part of this machine.

The apparatus as a whole is shown in Figs. 1 to 4, inclusive, and comprises a frame 1 having a transverse partition 2 extending horizontally between the end walls 3 and 4 thereof. Rotatably mounted on the said partition 2 are the sprocket wheels 5 and 6, which mesh with a sprocket chain 7, having arms 8 extending from the links 9 of said chain.

A casing 10, having semi-circular end walls 11 and 12, is suitably secured to the partition 2 with the semi-circular walls 11 and 12 concentric with the axes of rotation of the sprocket wheels 5 and 6, respectively. The arms 8 form with the walls of the casing 10 a plurality of compartments 13, each of which is adapted to receive an orange, or grapefruit, or similar object, to be processed by this apparatus. The partition 2 is provided at one end with a hopper-like aperture 14, from the opposite ends of which depend a pair of wires 15 and 16 adapted to guide the fruit 17 into proper position to be cut by a knife 18 forming part of the juice extracting machine to be described hereafter.

As will be shown hereafter, the fruit 17 is cut by the knife 18, and then has the separate parts thereof moved to a milling device 19 for extracting the juice from said parts. The extracted juice is delivered through a spout 20 to a hopper 21, supported by a bracket 22 immediately above a cup 23 carried by an endless conveyor 24, which may be controlled either manually or by coin controlled mechanism of any well-known construction.

The conveyor 24 is of the endless chain type and is mounted on sprocket wheels 25 and 26, supported rotatably by horizontal shafts 26 and 27 in the casing 1. The conveyor 24 is provided at intervals with lugs 28, spaced at predetermined intervals apart in order to engage and move the cups 23 from one predetermined position in the machine to another. As shown in the drawings, the cups 23 are supported by a chute 29 of any usual or well-known construction; and the cups 23 are adapted to be successively fed from said chute onto the conveyor 24, immediately in front of each lug 28, and by means of the trip mechanism designated generally by the reference numeral 30.

The details of the trip mechanism 30 are not illustrated herein because they form no part of the present invention, and any suitable trip mechanism may be substituted therefor to perform the same function. The conveyor 24 is designed for intermittent operation and moves the cups 23 from the cup container 29 during one of its intermittent movements to a predetermined position under the hopper 21, and during the succeeding movement to a predetermined position on a receiver plate 31, supported by a bracket 32 on the end wall 3 of the casing 1.

The distance between the axial center of the container 29 and that of the hopper 21 is exactly equal to that between the axes of the hopper 21 and the position of the cup 23 on the receiver plate 31. This relation must exist because of the necessity of moving the cup by the conveyor 24 at each intermittent movement from the fixed cup container to the fixed hopper 21.

It will be understood, of course, that the endless conveyor 7 moves through a space equal to the width of one of the compartments 13 during the time the endless conveyor 24 is moving through a distance equal to that between the cup container 29 and the hopper 21. To effect this timed movement between the said conveyors, a vertical shaft 33 is suitably journaled in a partition 2, and has a beveled gear 34 at the lower end thereof and in mesh with a beveled gear fixed to the end of a shaft 36, which is operated by beveled gears 37 and 38, the latter of which is secured to the intermittently rotatable shaft 27.

The means for intermittently rotating the shaft 27 are not shown herein, because this means is very well known in practically all of the mechanical arts and may be varied to suit the circumstances. The shaft 33 is provided at the upper end thereof with a kicker 39, having a lug 40 projecting therefrom to contact with the end 41 of a link 42, which is slidably mounted in a bracket 43, suitably secured to and supported by the partition 2. The link 42 is pivoted at one end to the end of a lever arm 44, which has a pawl 45 pivoted to the other end thereof and adapted to cooperate with a ratchet wheel 46 to impart intermittent rotation to the stub shaft 47, which carries the sprocket wheel 6.

The end of the link 42 is enlarged; and between this enlarged end and the up-standing flange 47 of the bracket 43, there is interposed a coil spring 48. A sleeve 49 pinned to the link 42 limits the movement of the link 42 through the flange 47 in order to ensure that the enlarged end 41 of the link 42 shall always be in the path of rotation of the lug 40. It will be apparent from inspection of Fig. 2, that with every rotation of the shaft 33, the lug 40 will kick the link 42 and thereby rotate the ratchet wheel 46 through a distance equal to one tooth, which is the distance necessary to move the conveyor so as to bring a compartment 13 immediately over the aperture 14 at the termination of every complete rotation of the shaft 33.

As will be described hereafter, the two halves of the orange 17, or similar object, are returned to the position shown in Fig. 1 after the juice and seed and pulp have been extracted therefrom. When in this position, these waste parts are knocked by extractor rods, to be described later, from the position shown into a hopper 49 for conducting the waste skin and pulp away from the apparatus.

This apparatus is designed to feed either fruit juice or juice and pulp to the cups 23; and in order to dispose of such seeds as may come to the hopper 21 by the milling of the fruit, this hopper is provided with a slot through the side thereof, in which is slidably mounted a baffle plate 50, which is pivotally mounted on the upper end of a lever 51, adapted to be swung toward and from the hopper 21 by means of a cam plate 52, pivotally mounted on the side of a seed chute 53.

The cam plate 52 is rocked about its pivot axis by a projecting arm 54, which extends laterally from each of the cup engaging lugs 28 and into and out of sliding contact with the cam plate 52. The juice extracting machine is constructed so that the juice flows first through the hopper 21, and the seeds are thrown into the hopper 21 after the juice has passed therethrough. It is, therefore, necessary to time the reciprocation of the baffle plate 50 so as to intercept the seeds immediately after the cup 23 has been filled with juice and is being moved away from the hopper 21.

The cups 23 pass through an aperture 55 formed in the end wall 3; and this end wall has a light screen door 56 pivoted thereto and spring controlled to close said aperture 55 immediately after the passage therethrough of a filled cup 23.

As will be apparent from Fig. 3 of the drawings, the hopper 21 is bifurcated to receive the spouts 20 projecting from the lower end of the mills 19, which are symmetrically arranged on opposite sides of the hopper 21. It will also be evident that the conveyors 7 and 24 must be at rest while the mills 21 are extracting juice from the halves of the fruit presented thereto. The timing of the several parts of the apparatus is a matter of mechanical skill and is not described in detail in this application. This finishes the description of the general arrangement of the apparatus as a whole. The details of construction of the juice extracting elements of the machine will now be taken up for description.

The juice extracting machine forming part of this apparatus comprises a base plate 57, and a pair of standard clips 58 and 59 standing perpendicularly from one side of said base plate 57 and adjacent the opposite ends thereof. A cover plate 60 is detachably secured to said standard plates 58 and 59, and forms with said standard plates and base plate a casing for the operating mechanism of this machine.

A rock shaft 61 is journaled in the plates 58 and 59, and is provided with a tongue 62 adapted to prevent rotation thereon of a pair of sleeves 63 and 64, which are slidably mounted on the said rock shaft 61. Each of the sleeves has an arm 65 extending radially therefrom, and having at the free ends of each arm a chuck designated generally by the reference numeral 66. Since the arms 65 and the chucks carried thereby are identical in construction, only one of the said arms and chucks will be specifically described, and the same numerals will be applied to the corresponding elements in each chuck and arm.

The structural details of the chucks 66, as applied to the arms 65, are shown in Figs. 42 to 54, inclusive. The upper end of the arm 65 is provided with an aperture 68, through which extends a hollow cylindrical support 69, which is screwthreaded externally to receive a nut 70 for securing said support to said arm 65. The support 69 is extended laterally to form a flange 71, which seats against one face of the upper end of the arm 65 and is drawn into close contact therewith by means of the nut 70. A dowel pin 72, extending into the flanged part of the support 69 and through the upper end of the arm 65, prevents rotation of the support in said arm.

A hollow cylindrical member is secured to the support 69 by means of the screws 73, and this member 74 (see Figure 53) is provided with an axial bore 75 alined with the bore 76 in the supporting member 69 to receive an ejector pin 77 which is slidably mounted in the said alined bores 75 and 76. The bore 75 of the cylindrical member 74 is enlarged to form a large countersink 78 in which is slidably mounted a frusto-conical sleeve 79 adapted to slide on a reduced part 80 of the ejector pin 77 between a shoulder 81, formed on said pin, and an ejector abutment 82 fixedly secured to the end of said reduced part 80.

The cylindrical member 74 is provided with a plurality of radial slots 83 spaced equidistantly from each other around said member. These slots 73 extend clear through the member 74 into the enlarged bore or countersink 78. Seated in each of these slots is a chuck member 84 pivoted at one end thereof to a pivot ring 85 (see Figure 51), the flange of the supporting member 69 being provided with a corresponding number of radial slots 86 to permit rotation of the arcuate pivot ends 87 of the chuck members 84 about their pivot ring 85.

The pivot ring 85 is seated in an annular groove 88 formed in the end of the cylindrical member 74, and is held in this groove 88 by contact with the bottom of a correspondingly shaped annular groove 89, formed in the flange of the supporting member 69. Both of said annular grooves are semi-circular in cross section and fit snugly over the pivot ring 85 when the member 69 is properly secured by the screws 73 to the member 74.

As will be apparent from inspection of Figures 51 to 53, the slots 86 correspond in number and location on the supporting member 69 to the number of the slots 83 and location thereof on the member 74. Preferably, the slots should be even in number in order to permit the slots on the flanged part 71 of the member 69 to be machined straight across a diameter of said part 71.

Each of the chuck members 84 has its free ends spread out arcuately to terminate in a grip 90 adapted to sink into the skin or rind of fruit, preferably of the citrus variety, in order to hold the fruit for cutting and milling operation adapted to be performed by other parts of this machine. The cylindrical member 74 is provided, between its ends, with an annular arcuate groove 91, adapted to form a seat for correspondingly shaped arcuate plates 92, suitably secured to the chuck members 84 between the ends thereof. These arcuate plates 92 prevent the gripping ends of the chuck plates 84 from approaching each other too closely to permit the insertion of the fruit between the gripping ends.

The arcuate plates 92 are also shaped to receive an annular coil spring 93 which holds the chuck plates 84 normally in their closed position (as shown in Figure 48) with the stop plates 92 seated in the arcuate groove 91. The sleeve 79 is adapted to contact with and slide along the inclined edges 94 of the chuck plates 84, whenever the ejector pin 77 is moved from the position shown in Figure 48 to that shown in Figure 46.

At the limit of inward movement of the ejector pin 77 toward the grips 90, the sleeve 79 is seated under a flat portion 95 on the lower edge of the chuck member 84 and holds all of said chuck members with the grips 90 spread apart as a preliminary to the reception of a fruit between said grips 90. The abutment 82 is located so as to contact with the fruit 96 (see Figure 46) and to be forced by contact with said fruit when the arm 65 is swung inwardly in the direction of the fruit. Continued pressure of the fruit on the abutment 82 causes the inner end 97 of said abutment to contact with the sleeve 79 and force the sleeve from under the flat portion 95 of the chuck plates 84 and thereby permit the springs 93 to force the chuck plates inwardly toward each other in order to embed the grips 90 in the fruit, as shown in Figure 48.

The grips 90 extend transversely across the ends of the chuck plates 84 and hold the fruit against movement axially from the cylindrical member 74. In order to prevent rotation of the fruit 96 in the grips 90, the inner arcuate edges 98 of the chuck plates 84 may be provided with any desired number of teeth 99 adapted to embed in the periphery of the fruit and prevent rotation thereof in the chuck. Any desired number of teeth 99 may be formed on the chuck plates 84, and may be made of any desired length or omitted altogether, according to the texture of the rind or skin of the fruit being processed.

The ejector pin 77 is screwthreaded at its outer end to receive a nut 100, which forms a stop to limit the movement of the said ejector pin axially in the bores 75 and 76, and a lock nut 101 is threaded on to the end of the said ejector pin to contact with and lock the stop nut 100 in adjusted position on the said ejector pin.

As previously described, the arms 65 which carry the chucks 66 are fixedly secured to the sleeves 63 and 64, slidably but nonrotatably mounted on the shaft 61. In order to slide these arms toward and from each other on the shaft 61, the said sleeves are each provided with pins 102 and 103 adapted to contact, respectively, with guide edges 104 and 105 of a slot 106 formed in the end of an arm 107 of a bellcrank lever which is mounted to swing on the base plate 1 about a pivot 108.

The arm 109 of the bellcrank has the free end thereof formed with teeth 110 in mesh with teeth 111 formed on the end of the arm 112 of a second bellcrank mounted to swing on the said base plate 1 about the pivot 113. The other arm 114 of the second bellcrank is similar to the arm 107 of the first bellcrank, and the two bellcranks constitute a pair for moving the pair of arms 65 toward and from each other on the shaft 61.

As the elements on the free end of the bellcrank arms 107 and 114 are identical in construction, only one of them will be described, and the corresponding parts will be designated by the same reference numerals.

Referring now particularly to Figure 20, and to the bellcrank arm 107 shown in said figure, there is illustrated a leaf spring 115 secured at one end to a branch 116 of the lever arm 107 and having a return bent part 117 extending between the edges 105 and 104 of the slot 106, a slotted guide 118 being fixed to the end of the branch 116 to limit the movement of the part 117 (see Figure 25). The free end of the part 117 is provided with a plate 119 having an edge 120 adapted to contact with and guide the pin 102 of the sleeve 64 when the arm 65 is thrown to the rear of the machine in order to grip or release fruit located at the rear of the machine either prior to or after the extraction of juice therefrom, the rear of the machine being considered that part to which the fruit is originally presented for processing.

The guiding edge 105 contacts with the pin 103 when the arm 65 is thrown forwardly to present a cut part of a fruit to the mill 19. The guiding edge 105 is rigid because the half fruit is forced unyieldingly into contact with the rotating miller of the mill 19, while the guiding edge 120 must be yieldingly mounted in order to permit a slight lateral yielding of the pair of arms 65 to accommodate fruit of different diameter, when presented at the feeding rear end of the machine.

The bellcrank lever arms 107 and 114 merely control the movement of the arms 65 toward and from each other. In order to move these arms from front to rear of the machine and vice versa, the machine is provided with snap-over mechanism designated generally by the reference numeral 121 (see Figures 11 and 27 to 33, inclusive).

The snap-over mechanism 121 is operated by the rotation of a shaft 122 supported rotatably in the standard plates 58 and 59. The means for rotating this shaft 122 will be described later in this specification, so far as operation of the snap-over mechanism is concerned, it will be sufficient to state that this shaft controls the operation thereof.

A pinion 123 is secured on said shaft to rotate therewith; and this pinion meshes with a gear 124, of twice the diameter of the pinion 123, to rotate a shaft 125 also journaled in the bearing plates 58 and 59 and having the gear 124 fixed to the end thereof. The shafts 122 and 125 are parallel to the rock shaft 61, and this rock shaft projects through the bearer plate 59, and has secured thereto at the end thereof a crank arm 126. Pivoted eccentrically to this crank arm 126 is the snap-over plate 127 which is provided with a projection 128 to receive the pivot screw 129 which connects said plate 127 pivotally to the crank arm 126. The plate 127, at the rear end thereof, has a downwardly projecting part 130 provided with a laterally extending lug 131. An eye bolt 132 extends through the lug 131 and passes slidably through a slot 133 formed in the base plate 57, a nut and washer 134 and 135, respectively, being secured to said eye bolt to retain it slidable in the slot 133 on the base plate 57.

A coil spring 136 is secured at one end to a pin 137 projecting laterally from the upper end of the crank arm 126, and has its other end secured to the eye 139 of the eye bolt 132.

As shown in Figure 27, the arms 65 are at the rear end of the machine, and the spring 136 is at the rear side of the pivot screw 129 which connects the snap-over plate 127 pivotally to the crank arm 126. In Figure 28, the arms 65 are shown as thrown forwardly to a position in which they present the cut halves of the fruit to the mill.

The snap-over plate 127 is provided at its forward end with an inclined slot 140 of the same width as the diameter of the projecting end 141 of the shaft 125. The ends of this slot limit the throw of the plate 127 in either direction by the spring 136. The upper edge of the forward end of the plate 127 is provided with an inwardly projecting lug 141, and the lower edge of the plate 127 is provided with another inwardly projecting lug 142 adapted to be contacted by a pin 143 projecting laterally from the gear 124 near the periphery thereof.

Assuming that the gear 124 is rotated in the direction of the arrow shown in Figure 27, it will be apparent that the pin 143 contacts with the front face of the lug 141 and the rear face of the lug 142, in alternation as the gear 124 rotates.

As shown in Figure 27, the arms 65 are at the rear end of the machine and the lower end of the slot 140 is in contact with the projecting end 141 of the shaft 125, and thereby prevents further rearward movement of the arms 65. In this position, the pin 143 is just about to contact with the rear face of the lug 142. Continued rotation of the gear 124 causes the pin 143 to pull the plate 127 toward the front of the machine against the resistance of the spring 136, and the inclination of the slot 140 causes the end 141 of shaft 125 to lower the forward end of the plate 127 so that when the said end 141 reaches the upper end of the slot 140 the pin 143 just clears the top of the lug 142. In the meantime, the spring 136 has moved from the rear side of the pivot 129 to the front side thereof, as shown in Figure 28, and in this position holds the arms 65 and plate 127 yieldingly in their forward position.

As the gear 124 continues to rotate the pin 143 engages the front edge or face of the lug 141 and throws the plate 127 along with the arms 65 to the rearward position shown in Figure 27. So long as the gear 124 continues to rotate, the arms 65 will be thrown alternately from front to rear of the machine, and vice versa.

The cover plate 60 (see Figure 9) is provided with slots 144 and 145 to permit the throw of the arms 65. In either of their extreme positions, it is necessary to slide the arms 65 toward and from each other lengthwise of the rock shaft 61 in order to cause the chuck members 66 to engage and grip the orange or other fruit when presented at the rear end of the machine, and to move the cut portions of the orange or similar fruit toward and from the mills 19 when the arms are at their extreme forward position.

The necessary lateral movement of the arms 65 must of necessity be carried out in timed relation to the movements of the arms from front to rear of the machine and vice versa. To effect this lateral movement, the shaft 122 has secured thereto a cam 146 (see Figures 11, 21 and 22), and this cam 146 rotates in a cam slot 147 formed in a cam plate 148 which is pivotally mounted at its upper end to swing about a pivot 149 supported between standards 150 and 151 which extend upwardly from a plate 152 supported in spaced relation to the base plate 57 by means of spacer disks 153 and 154 and screws 155 and 156.

The shaft 122 is suitably journaled in the standards 150 and 151 as well as in the standard plates 58 and 59 and has a knife operating link 157 pivoted thereon at one side of the cam 146.

The lower end of the cam plate 148 has a pin 158 projecting therefrom and into an aperture 159 formed in a slide plate 160 which is provided on its lower face with two pins 161 and 162 for operating the bellcranks 107 and 114. As will be apparent from Figures 20 and 26, the plate 152 is provided with two parallel guide slots 163 and 164 adapted to receive and guide the pins 161 and 162 formed on the slide plate 160.

The pins 161 and 162 engage the apertures 165 and 166 formed in the bellcrank arms 109 and 112, respectively, and are intended to cause rotation of the bell crank about their pivot 108 and 113 by the sliding movement of the plate 160 as effected by the cam plate 148 when caused to oscillate about its pivot 149 by means of the cam 146 on the constantly rotating shaft 122.

As previously stated, the cam 146 is so located relative to the slot 147 that the rotary movements of the bellcrank are timed so as to cause the arms 65 to approach and recede from each other in proper timed relation to their movements from one end of the machine to the other.

In order to control the opening of the chuck members 84, and the ejection of pulp and rind therefrom, the rear end of the machine is provided with kicker arms 167 and 168 to operate the ejector pins on each of the arms 65.

As the ejector arms 167 and 168 are identical structurally and are similarly operated from the shaft 125 in timed relation with the operation of the other elements, it will be sufficient to describe the structural details of the arm 167 and the operating means therefor. The corresponding parts of the arm 168 and its operating mechanism will be designated by corresponding reference numerals.

The arm 167 is pivoted on a bracket 169 suitably secured to the base plate 57 on the outer side of the standard plate 59 to swing toward and from said standard plate 59 in the slot 170 (see Figure 9) formed in the cover plate 60. A link 171 is pivotally connected at one end to the arm 167 near the lower pivoted end thereof, and has its other end pivoted to a lug 172 (see Figure 45) which is swiveled to the end of an arm 173 of a bellcrank. The other arm 174 of the bellcrank has a lug 175 swiveled to the free end thereof, and through this lug 175 slides a rod 176 which is also slidably mounted in apertures suitably formed in guide lugs 177 and 178 fixedly and extending laterally inward from the standard plate 59.

The bellcrank 173—174 is pivotally mounted on a standard 179, and this standard is provided with a shoulder 180 which acts as a stop for engaging the edge of the bellcrank arm 174 to limit the movement of the rod 176 rearwardly of the machine. A coil spring 181 is interposed between the guide lug 177 and the swiveled lug 175 to maintain the bellcrank arm 174 normally against the stop shoulder 180 (see Figure 45) with the kicker arm 167 normally swung away from the bearer standard plate 59.

The rearward end of the rod 176 is screw-threaded and lock nuts 182 are threaded thereon to contact with the rearward end of the swiveled lug 175 in order to limit the forward position of a catch 183 secured to the forward end of the rod 176. The catch 183 extends downwardly to contact with the periphery of a snail cam 184 which is fixedly mounted on the shaft 125.

Since the operation of the kicker arm 167 is controlled from the shaft 125, it will be obvious that the arm 167 is swung about its pivot in timed relation with the movements of the arms 65. The upper ends of the kicker arm 167 are located so as to strike the outer ends of the ejector pins 77 in order to slide said pins inwardly of their chucks 66 and spread the chucks apart in order to release the pulp and rind of fruit therefrom after a juice extracting operation has been completed by the mills 19 and the arms 65 have been returned to the rear of the machine in order to dispose of the pulp and rind.

After the chuck arms 84 of the chucks 66 have been spread apart by operation of the kicker arms 167, the chuck arms 84 remain open until an orange or similar fruit or vegetable has been placed between the chucks and the inward movement of the arms 65 has caused the ejector pins 77 to be moved outwardly. This outward movement releases the arms 84 and permits the circular coil springs 93 to close said arms firmly onto the fruit 96, in order to hold the latter in position to be cut by the knife 18 as a preliminary to the separation of the orange into parts adapted to be moved forwardly of the machine by said chucks and into operative engagement with the mills 19.

The cutting of the orange or other fruit is effected by a knife which is given a slicing movement by mechanism about to be described. The knife 18 has its lower end fixed to a radial arm 185 extending from a hub or sleeve 186 which is pivotally secured to a pivot pin 187 slidably mounted in inclined slots 188 formed in the upper end of standards 189 and 190 which are fixedly secured and extend perpendicularly from the base plate 57.

A link 191 is pivoted to the radial arm 185 at one end of said link, and the other end of the link is provided with laterally extending pivot pins 192 which are slidably mounted in slots 193 formed in the standards 189 and 190.

The slots 193 are struck on an arc having its center at the axis of the drive shaft 122 and a link 194, pivoted at one end to the shaft 122, has its other end pivotally connected to the pivots 192 extending laterally from the lower end of the link 191. The link 194 is provided immediately above the shaft 125 with a cam plate 195 adapted to be engaged by a pin 196 extending laterally from a cam wheel 197 fixed to the shaft 125.

As will be apparent from Figure 16, when the link 194 is raised by sliding engagement of the pin 196 with the lower edge of the cam plate 195 the link 191 will swing the knife 18 about its pivot pin 187 from the position shown in Figure 16 to the substantially vertical position shown in Figure 12.

In the position shown in Figure 12, the link 194 is substantially horizontal and a trip locking plate 196' (see Figure 17), pivoted to swing about a pivot 197' at the end of an arm 198, projecting from the lower end of the plate 196", is adapted to be swung against the side of the link 194 until the shoulder 199 seats under the lower edge of the link 194 to hold it horizontal against the pressure of the spring 200 acting on the out-turned end 201 of the rod 202, which is slidably mounted in a casing 203 at the front end of the machine.

The spring 200 is the means for forcing the knife 18 against the fruit to be cut, and this spring is interposed between an abutment sleeve 204, pinned to the lower end of the rod 202, and a nut 205 screwthreaded into the upper end of the cylindrical casing 203. The out-turned end 201 of the rod 202 passes through a slot in the side of the casing 203 in the path of movement of the link 194.

The upper end of the rod 202 is screw-threaded and passes freely through an aperture in the nut 205. An adjusting nut 207 is threaded onto the upper end of the rod 202 to control the distance of travel of the rod 202 in its casing 203. A lock nut 208 may be used to lock the adjusting nut 207 in adjusted position.

The upper end of the trip lock 196 is held normally against the side of the link 194 by means of a leaf spring 209, see Figure 17, secured to plate 57 and bearing up under trip 196′, as shown.

In order to trip the arm 196′, a rod 211 is pivotally mounted at one end between standards 212 and has its other end projecting into the path of a lug 213 extending radially from the periphery of the cam wheel 197.

The rod 211 extends through a slot 214 formed in the lower end of the arm 196′ and a spring 215, having one end fixed to the base plate 57, extends under the rod 211 to maintain it normally in contact with the upper end of the slot 214 and thereby hold the arm 196′ against the side of the link 194. When the lug 213 on the cam wheel 197 engages the end of the rod 211, it causes the rod to engage the bottom end of the slot 214 and swing the arm 196′ about its pivot 197′ to release the link 194 and permit it to be swung downwardly by the spring pressure of the outturned end 201 of the rod 202.

When the trip arm 196′ is released, the links 194 and 191 swing the knife 18 very forcibly against the fruit 96; but the mere impact of the knife will ordinarily be insufficient to cause the separation of the fruit into two parts. For this reason means has been provided in this machine, not only to force the knife downwardly against the fruit 96, but also to effect a slicing movement of the knife as it passes through the fruit.

The slicing movement is effected by means of a pair of radial arms 216 and 217, each having a slot 218 at one end thereof and a circular bearing 219 at the other end thereof to receive eccentrics 220 fixed to opposite ends of a gear wheel 221 which is keyed to a shaft 222 rotated by the mechanism for rotating the shaft 122.

At the start of a fruit slicing operation, the knife 18 is in the vertical position shown in Fig. 12. In this position the pivot 187 has its ends hard up against the upper end of the slots 188 formed in the top of the standards 189 and 190. Just as soon as the trip rod 211 is operated by contact with the lug 213 on the cam wheel 197, the lock 196 is thrown from under the link 194. The out-turned end 201 of the spring controlled rod 203, forces down the link 194, and this in turn pulls down the link 191 to the position shown in Fig. 15.

Particular attention is directed to the fact that when the link 194 is moved from the position shown in Fig. 12 to that shown in Fig. 15, the pivot 187 is moved from the upper end of the slot 188, as shown in Fig. 12, to the lower end of the slot, as shown in Fig. 15. It will be apparent from these two figures of the drawings that as the knife 18 is thrown forcibly rearwardly against the fruit 96, it is also drawn downwardly and forwardly in a slicing movement toward the front of the machine.

In the position shown in Fig. 15, the knife has not yet completed its cutting operation. Therefore, a further downward slicing movement is required before this operation is completed. This final movement is accomplished by the radial arms 216 and 217, which it will be noticed are in their lowest position when the pivot 187 is at the bottom of the slot 188. As the gear 221 rotates, its eccentric 220 forces the radial arms 216 and 217 upwardly and moves the pivot 187 from the bottom to the top of the slot 188.

During the movement of the pivot 187 from the bottom of the slot 188 to the top thereof, the pivot 192 of the link 191 has been held stationary by the link 194. It will be apparent from inspection of Figs. 15 and 16 that during this movement of the pivot 187, the knife 18 has been moved downwardly toward the base plate 57, and rearwardly by the rearward swinging of the link 191. Continued rotation of the gear wheel 221 reverses these operations and restores the knife 18 to the position shown in Fig. 12.

It will be obvious from the foregoing disclosure that the knife 18 not only has a rotary movement, but also has a slicing movement through the fruit presented thereto for cutting. It will also be obvious from inspection of Figs. 12 and 15 that the slicing movement of the knife 18 depends upon resistance to the movement of the knife offered by the fruit positioned between the chucks 66 of the machine; because if there be no resistance to the downward movement of the knife, the pivot 187 will remain in the position shown in Fig. 12, and would not reach the position shown in Fig. 15 to be pushed upwardly by the movements of the radial arms 216 and 217.

The gear 221 driven by the shaft 222 is the means for operating the mills 19 which are positioned on the cover plate 60. The shaft 222 extends through and is journaled in the standard plate 58, and has a gear 223 fixed thereto on the outside of the plate 58, (see Figs. 9 and 10).

The shaft 222 merely rotates the gear 221 and the eccentrics 220 secured to opposite sides thereof, and also rotates the gear 224, (see Fig. 15), for operating the mills 19. The shaft 122 operates all the other mechanism heretofore described; and this shaft 122 is rotated by a pinion 225, (see Figs. 9, 10 and 11), which in turn is operated by a pinion 226 of a gear set designated generally by the reference numeral 227, and supported between plates 228 and 229, adapted to be seated bodily on the base plate 57 and secured by suitable screws and spacing members 230 and 231 to the outer side of the standard plate 58.

The drive shaft 232 of the gear set 227 is rotatably mounted in the plates 228 and 229, and has a pinion 233 fixed to the inner end thereof and in mesh with the teeth of the gear 223 which drives the shaft 222 and the gears 221 and 224 for operating the mills 19.

The shaft 222 extends also through the plate 228 of the gear set 227 and has a small pinion 234 fixed to the end thereof to mesh with a large gear 235, which is fixed to a stub shaft 236 journaled in the plates 228 and 229. The stub shaft 236 has a pinion 237 fixed thereto and in mesh with a large gear wheel 238 which is fixed to a second stub shaft 239, having the pinion 236 fixed thereto to drive the pinion 225 for the shaft 122.

The relative dimensions of the gears employed in this machine need not be specifically set forth herein because this can be readily worked out by anyone skilled in the art in order to effect the operation of the several parts of the machine in properly timed sequence. We now proceed to describe the structural details of the milling parts of this machine.

A shaft 240, to which the mill operating gear 224 is fixed, (see Fig. 12), is journaled in the side walls 241 and 242 of a gear casing having a front wall 243 and a rear wall 244 provided with a slot 245 for the passage of the knife 18 from a vertical position in the said gear casing to the horizontal slicing position outside of said casing, and vice versa.

The end walls of the gear casing have lugs 246, 247, 248 and 249, at the bottom thereof, for securing the said gear casing perpendicularly to the cover plate 60. The shaft 240 extends in opposite directions from the gear 224 and carries at each end thereof a self-cleaning mill, designated generally by the reference numeral 250 (see Figs. 56 to 59, inclusive).

As shown clearly in Fig. 55, the mill 250 comprises an internally threaded cylindrical support 251 adapted to be threaded onto the screw-threaded end 252 of the shaft 240, in order to clamp to the said shaft 240 a frusto-conical plate 253. To effect this clamping operation, the plate 253 is provided with hubs 254 and 255 extending in opposite directions from the center of said plate.

The end of the hub 254 abuts against the side of the gear 224 and is securely clamped thereto by turning the support 251 so as to force the said hub into close contact with the side of said gear. The inner end of the support 251 is formed as a flange 256, provided with a countersink 257 adapted to receive the hub 255.

The miller 250 is peculiarly constructed in order to prevent fruit juices from flowing into the inner mechanism, and to make the several parts thereof self-cleaning. It is composed of a series of spherical plates 258, 259, 260, 261, 262 and 263, pivotally connected respectively to pivot pins 264, 265, 266, 267, 268 and 269. These spherical plates overlap each other, as shown in Fig. 57, and are each provided with ribs 270, for gouging out and extracting juice from the sections of fruit presented thereto in the milling operation of the machine.

The pivot pins 264, 265, 266, 267, 268 and 269 are carried by a dome-shaped support 271, which is provided with a central hub 272, from which projects a screw-threaded pin 273 adapted to be threaded into an internally screw-threaded aperture 274 in the outer end of the cylindrical support 251. Each of the ribs 270 is slotted at its upper end to allow this upper end to project slightly over the dome 271; and this dome is provided with a pair of cross ribs 275 and 276, to supplement the ribs 270 in their milling action on the fruit presented thereto.

The several spherical segments 258, 259, 260, 261, 262 and 263 are adapted to pivot slightly around their pivots, but are limited in this pivotal movement by down-turned lugs 277 (see Figs. 55 and 60), which are shaped to correspond to the shape of the hub 272 and fit against said hub in order to limit the pivotal movements of the segments relative to each other.

The segments are of spring material and are held out in normally extended positions relative to each other by means of a spring dome-shaped plate 278, which is cut out to form spring fingers 279, 280, 281, 282, 283 and 284, normally pressing outward against the respective segments 258, 259, 260, 261, 262 and 263.

It will be apparent from the drawings that the segments of the miller 250 will yield to accommodate themselves to the diameter of the fruit sections presented to them for milling. It is intended that the miller 250 will be made to rotate in such direction that the fruit juices and pulp will flow over the outside of the overlapping segments, and not in such direction as to force the juice between said segments.

The frusto-conical plate 253 surrounds the miller 250 and terminates in a flat rim 285 (see Fig. 34). A similarly shaped frusto-conical plate 286 provided with a flat rim 287, is slidably supported by the plate 253, to be moved toward and from said plate 253 in order to vary the width of the annular slot 288 formed between the rims 285 and 287.

The inclined part of the plate 286 has fixed thereto, a plurality of tubes 289, which pass freely through apertures 290 formed in the inclined part of the plate 253, and which have an eye-bolt 291 extending from said tubes on the side of plate 253 opposite to plate 286. On the flat back of the plate 253, a series of radial levers 292, 293 and 294 are pivoted to swing about fulcrums 295, 296 and 297, respectively. The outer end of each of said levers passes through the ends of the eye-bolts 291 slidably and freely. The other ends of the levers are each provided with a tongue 298, which seats in the groove 299 formed in a sleeve 300 (see Fig. 35), which is slidably mounted on the hub 254 of the plate 253.

Each of the levers 292, 293 and 294 is provided with a weight 301 near the outer end of said levers; and these weights form with said levers governor mechanism operable by centrifugal force to draw the outer plate 286 in toward the plate 253, and thereby to narrow the slot 288 between said plates when the miller is operating at high speed. The weights 301 are arranged relative to the fulcrums of said levers so that when the machine slows down or stops, the weights 301 will cause said levers to push the plate 286 away from the plate 253, in order to enlarge the slot 288 to permit seeds and pulp to pass freely through said slot.

The outer frusto-conical plate 286 is provided with an aperture 302, in order to admit the chuck 66 into the space between the plates 253 and 286 and into operable contact with the miller 250.

In order to collect the fruit juice as it is thrown by centrifugal force through the slot 288, an annular casing 303 is fixed to the cover plate 60 in any suitable manner. This casing extends around the flat rims of the plates 253 and 286 and is shaped somewhat irregularly so as to direct the juice as it is thrown from the slot 288 into a troughlike part 304, (see Fig. 35), which extends completely around the annular member 303 until it reaches the spout 20 for directing the juice to the hopper 21 and therethrough to the cups 23 (see Fig. 1).

Since each of the millers is structurally identical with the other, the same parts are designated by the same reference characters in each case, and no further description is believed necessary. The plate 253, which is fixed to the shaft 240, is provided with a plurality of radially extending brushes, which project through the slots 288 and through slots 305 formed in the flat rim of the plate 286 and contact with the wall of the casing 303 to brush the said casing clear of juice and seeds, which may be thrown onto the wall of said casing in the operation of the machine.

As will be apparent from the description so far, the fruit milling mechanism is practically self-cleaning, since the parts thereof are so formed and operate by centrifugal force to dispense the extracted juice and throw off all waste matter by centrifugal force.

The starting position of the machine is shown in Fig. 9, in which an orange 96 is shown as held in position by the wires 15, to be operated upon by the knife 18. The chucks 66 are shown in their extended position, with the arms 65 spread apart from each other at their maximum distance apart. The kicker levers 167 and 168 are also at their outermost position out of contact with the ejector rod 77.

The machine is assumed to have been set in operation by the closing of a coin control switch, and the clutch element 306 is in contact with the clutch element 307, which rotates freely on the shaft 232, but is driven by a motor 308, or any other suitable source of energy. In this position the links 309, 310 and 311 are in the position shown in full line in Fig. 9, with the link 310 pivoted intermediate its end on a bracket 312, and the link 311 similarly pivoted on a bracket 313, the end of the link 311 being connected to a ring 314 seated in the groove 315, formed in the sleeve integral with the clutch element 306.

At the start of the operation of the machine and until the end thereof, the links 310 and 311 remain as shown in full lines in Fig. 9. The chucks move inwardly toward the fruit 96 until the periphery of the fruit presses in the abutment 82 and the ejector rod 77 to cause the chuck members 84 to close in on the fruit as shown in Fig. 11.

While the orange 17 is still held between the chucks 66, the knife 18 swings rearwardly and slices the orange 17 into segments 96, which are then held independently of each other in the chucks 66. The knife then swings upwardly into vertical position and the chucks separate to their limit of separation, as shown in Fig. 9. Then the orange 65 swings toward the front of the machine with the chucks on opposite sides of the mills 19. In this position, the arms 65 are caused to approach each other until the segments 96 of the orange or other fruit are brought into operable contact with the millers 250.

As soon as the milling operation on the segments 96 is completed, the arms 65 separate to their limit of separation and are then thrown rearwardly of the machine. In their rearmost position, the kicker levers 168 and 170 are thrown inwardly toward each other to strike the ends of the ejector pins 77 and cause the abutment 82 to strike the pulp, or rind, and throw the said pulp or rind from the chuck arm 84, which in the meantime are opened by the inward movement of the ejector pin 77, down through the opening in the cover plate 60 leading to the pulp ejecting spouts 48 and 49 (see Fig. 1).

As soon as the kicker levers 167 and 168 have struck the ejector pin 77, they are thrown to the rear and the levers 310 and 311 assume their straight positions with the clutch elements 306 engaged with the clutch element 307, ready for the next operation when the element 307 is started by the insertion of a coin in the coin controlled mechanism.

Referring now to Figs. 9, 11 and 27, it will be noticed that the shaft 61 is not positively controlled to limit the throw of the arm 65. Accordingly, the front and rear edges of the irregular apertures 144 and 145 are beveled to form a seat for ball-bearing 316 (see Fig. 44), adapted to slide on said beveled edges and to support the arm 65 in proper position in order to have the chucks on the ends thereof grip the fruit 17 when held in the wires 15 at the rear end of the machine and to present the cut section 96 in proper position to be operated upon by the mills at the forward end of the machine.

While I have particularly referred to this machine as adapted for cutting oranges, it must be understood that it is not to be limited by any means to such particular use, as it is intended to be used for extracting the juice by milling operation from any kind of fruit or vegetable having a rind or skin capable of being held against rotary movement by the chuck arms of the chuck 66, and capable of having the waste rind discharged from said chuck members by operation of the ejector pins 39.

What I claim is:

1. In a device of the character described, a juice extracting mill comprising a shaft, a frusto-conical disk secured to said shaft, a substantially conical ribbed member secured to said shaft, a second disk having an aperture at the center thereof concentric with said shaft and slidably supported on the first named disk, and means operable by the rotation of said shaft for moving the second named disk toward the first named disk.

2. In a fruit juice extracting machine, a rotary milling head comprising a support, a plurality of overlapping spherical segments pivoted to one end of said support, a cutting rib secured to each of said segments, and yielding means on said support for maintaining said segments normally in expanded position.

3. In a fruit juice extracting machine, a dome-shaped rotary milling head comprising spherical segments overlapping each other, a support to which one end of each of said segments is pivotally connected, a leaf spring carried by said support and contacting with the inner concave faces of each of said segments, and means to limit the rotary movement of each segment about its pivot relative to said support.

4. In a fruit juice extracting machine, a support, a shaft journaled in said support, and a dome-shaped milling head secured to said shaft and comprising a plurality of overlapping spherical segments each of which has a grinding rib secured to the outer surface thereof.

5. In a fruit juice extracting machine, a mill comprising a support, a shaft journaled in said support and having a frusto-conical plate secured to said shaft, a milling head secured to said shaft on the side of said plate opposite to said support, a second frusto-conical plate slidably supported by the first named plate and surrounding said milling head, means for moving a half of certain fruit onto said milling head, and a trough surrounding and overlapping the edges of said frusto-conical plate to receive fruit juices thrown by centrifugal force from said fruit through the space between said edges.

6. In a fruit juice extracting machine, a juice extracting mill comprising a shaft, a frusto-conical disk secured to said shaft, a dome-shaped rib member secured to said shaft, a second disk having an aperture at the center thereof concentric with said shaft and slidably supported on the first named disk, and governor mechanism operable by the rotation of said shaft for moving the second named lisk toward and from the first named disk.

7. In a fruit juice extracting machine, a juice extracting mill comprising a shaft, a disk secured to said shaft, a dome-shaped rib member secured to said shaft, a second disk slidable toward and from the first named disk, a sleeve slidable on said shaft, and governor mechanism connected to said sleeve and to the second named disk to limit the movement of the second named disk away from the other disk and to move said second disk by centrifugal force toward the first named disk.

8. In a fruit juice extractor, the combination of base plate having slots; bearings on the base plate containing a horizontal shaft; a milling head on each end of the shaft; an annular trough housing surrounding each head; a knife pivoted between the two housings; a support for a fruit adjacent the two housings; a pair of arms slidably mounted on a shaft below the base plate, reaching up through the slots and having fruit gripping members at their upper ends; means for causing the grippers to grip a friut on the support; means for causing the knife to halve the fruit; means for causing the arms to swing over to the heads; and means for causing the arms to recede from and approach each other on their shaft.

9. In a fruit juice extractor, the combination of a horizontal shaft; a milling head on the shaft; an annular trough surrounding the head and shaped to form a channel facing away from the shaft and return bent to form a second channel facing the first channel to catch juice thrown from the rotating head and guide into the first named channel.

In testimony whereof I affix my signature.

GUY C. GUM.